F. H. AUBEUF.
DIRIGIBLE HEADLIGHT.
APPLICATION FILED SEPT. 29, 1909. RENEWED SEPT. 3, 1913.

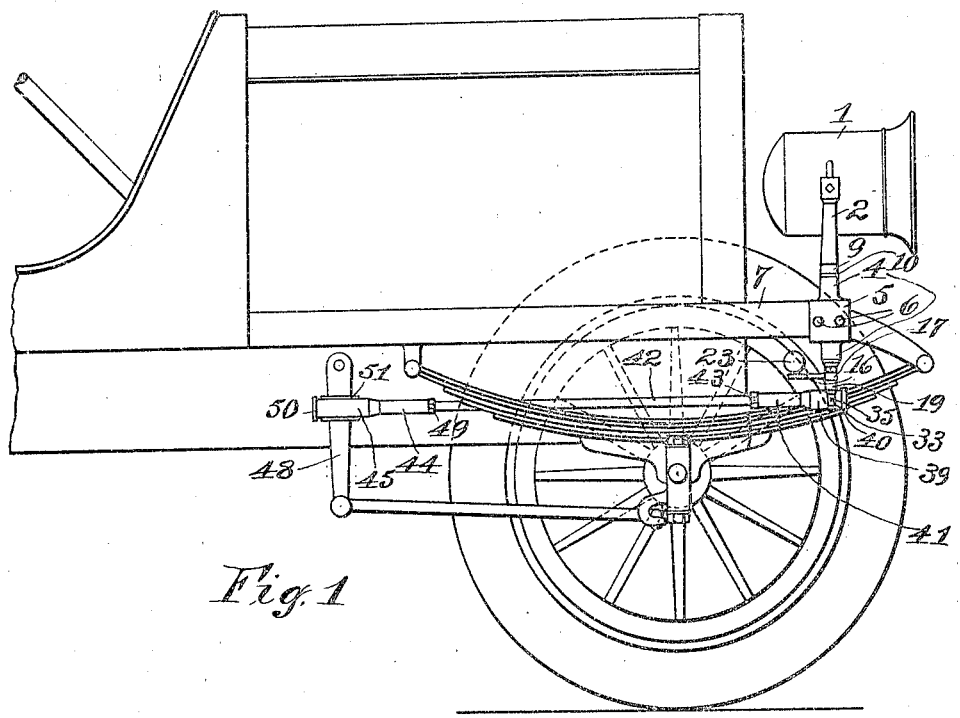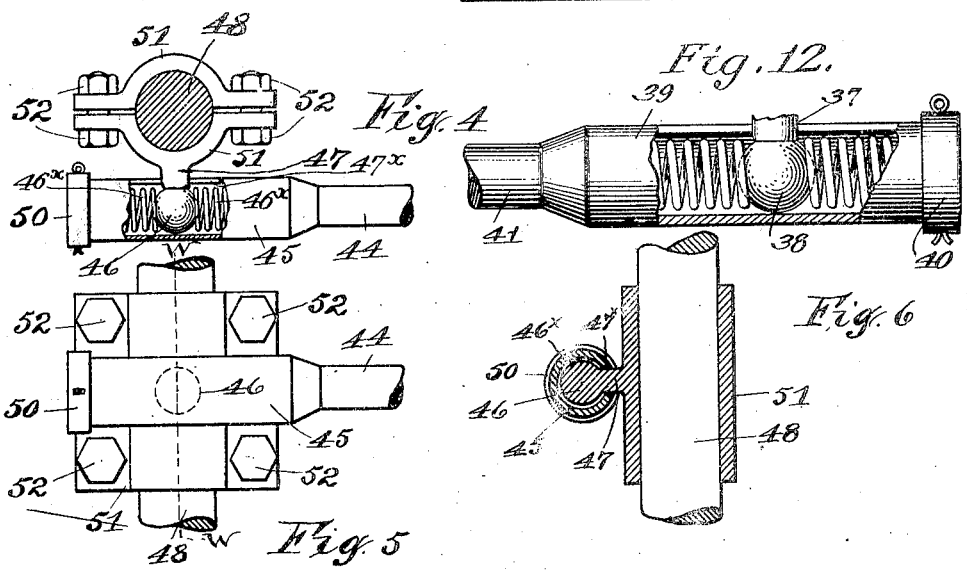

1,076,402.

Patented Oct. 21, 1913.
3 SHEETS—SHEET 2.

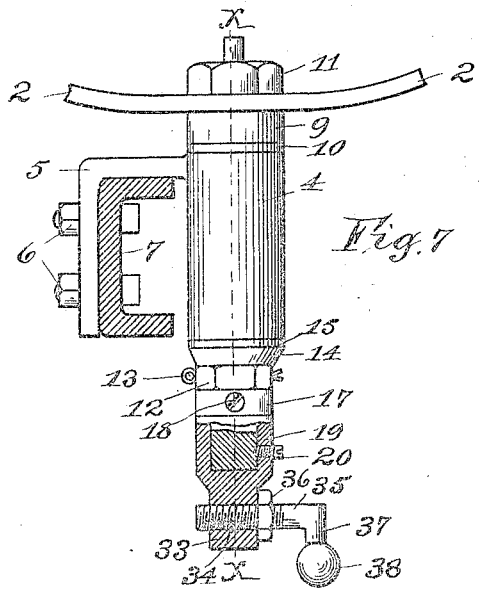
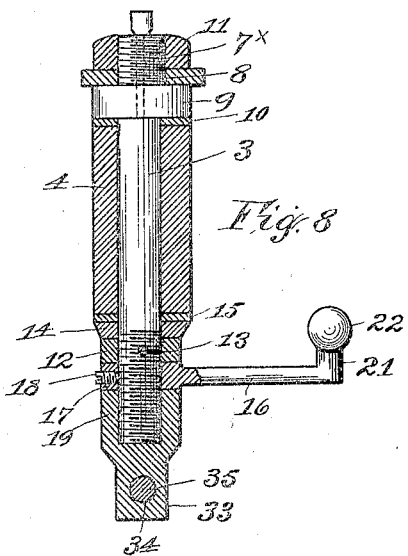
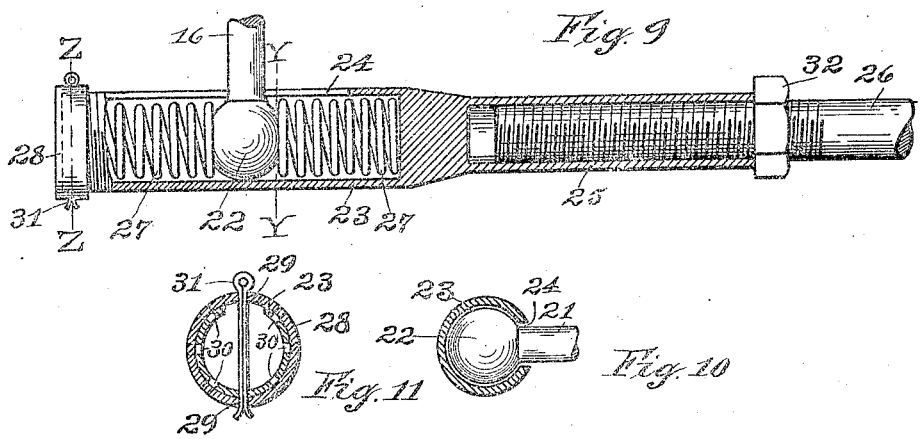

UNITED STATES PATENT OFFICE.

FRANK H. AUBEUF, OF ONEIDA, NEW YORK, ASSIGNOR OF ONE-HALF TO FRANK J. AUBEUF, OF ONEIDA, NEW YORK.

DIRIGIBLE HEADLIGHT.

1,076,402. Specification of Letters Patent. Patented Oct. 21, 1913.

Application filed September 29, 1909, Serial No. 520,091. Renewed September 3, 1913. Serial No. 788,001.

*To all whom it may concern:*

Be it known that I, FRANK H. AUBEUF, a citizen of the United States, and resident of Oneida, in the county of Madison, in the State of New York, have invented new and useful Improvements in Dirigible Headlights, of which the following, taken in connection with the accompanying drawings, is a full, clear, and exact description.

This invention relates to head-light supporting-brackets of motor-vehicles, and it has reference to the style of lamp-brackets which are pivotally mounted on the running-gear frame and connected to the steering-apparatus so as to throw the light to either side according to the direction in which the vehicle is turned.

The present invention resides primarily in the novel construction of the pivotal lamp-brackets and means connecting the two brackets, and secondarily in the novel arrangement and combination of the component parts of the mechanism for turning the said brackets, the main object being to provide a mechanism which can be easily and conveniently applied to the steering device of any style of motor-vehicle, and furthermore the object is to produce a bracket-rotating mechanism which will be simple in construction and at the same time efficient and reliable in its operation.

A further object of the invention is to provide a mechanism in which the connections of the component parts shall be capable of yielding so as to obviate undue strain and wear to guard against breakage and rattling of the parts incident to the jar and vibration to which the vehicle is subjected.

These objects are attained by the peculiar construction of the lamp-rotating mechanism, in combination with the usual rock-arm actuated by the so-called steering-gear which in almost every instance comprises a worm and coöperating worm-gear connected to a post provided with a hand-wheel.

Figure 3:
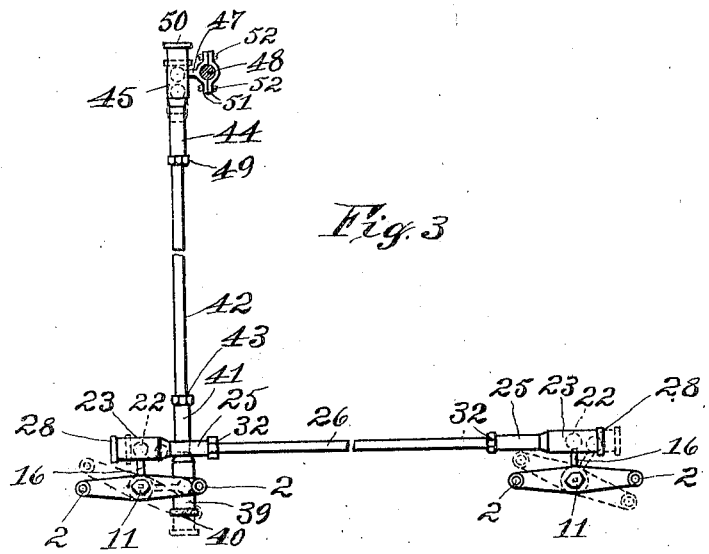
Figure 2:
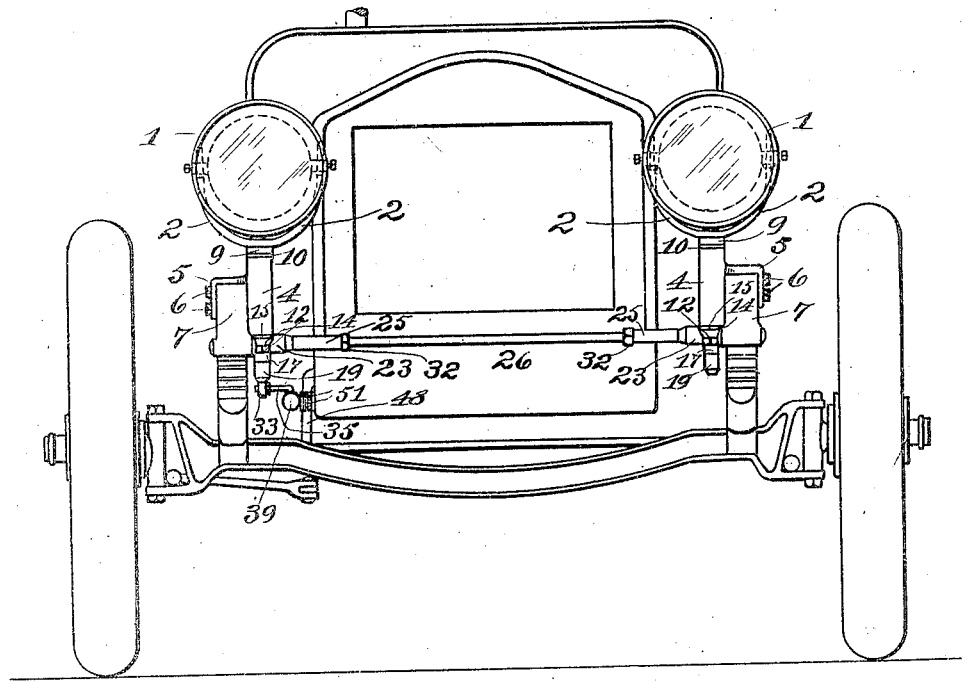

In the accompanying drawings Figure 1 is a side view of the front-end portion of a motor-vehicle equipped with my improved lamp-brackets and mechanism for turning the brackets; Fig. 2 is a front view of the vehicle; Fig. 3 is a plan view of the said mechanism detached from the vehicle; Fig. 4 is an enlarged detail plan view of the connection of the longitudinally extending rod to the rock-arm; Fig. 5 is an enlarged side view of the said connection; Fig. 6 is a vertical sectional view on the line —W—W— in Fig. 5; Fig. 7 is an enlarged front view of the lamp-bracket support, the lower portion being shown in section; Fig. 8 is a vertical sectional view on the line —X—X— in Fig. 7; Fig. 9 is an enlarged sectional view showing the yielding pivotal connection of one of the rods and an arm of the bracket-rotating mechanism; Figs. 10 and 11 are transverse sections on the lines —Y—Y— and —Z—Z— respectively in Fig. 9, and Fig. 12 is an enlarged detail side view, partly in section of the tubular socket at the forward end of the longitudinally extending rod.

Like numerals of reference indicate like parts in the several views in the drawings.

—1—1— denote the two front lamps of the vehicle, which lamps are supported upon brackets designed to be rotated for the purpose stated. Each of these brackets comprises the usual upwardly extending arms —2—2— to which the lamps are attached in the well known manner. The said arms are rigidly connected and preferably formed integral, and they are fastened to a vertically disposed spindle —3— supported rotatably within a sleeve —4— preferably formed on one side with an angular plate —5— which is secured by means of bolts —6—6— to the usual running-gear frame —7— of the vehicle. The said sleeves are preferably disposed at the inner sides of the frame-members and they project some distance thereabove. The arms —2—2— of the bracket may be attached to the rotatable spindle —3— in any suitable manner. However, I prefer to provide the portion connecting the arms with an aperture —8— through which the upper screw-threaded portion —1$^x$— of the spindle —3— extends, and provide a collar —9— between the apertured portion and adjacent end of the sleeve —4—. This collar may be formed integral with the said spindle or suitably fastened thereto and it is seated upon the end of the sleeve, and between the collar and sleeve, I prefer to interpose a non-metallic washer —10— composed of fiber or any other material.

On the upper end of the spindle —3— is a nut —11— bearing upon the connecting portion of the bracket-arms and serving to clamp the arms firmly to the collar —9— whereby the arms are turned incident to the rotation of the spindle. The lower end portion of the spindle is screw-threaded and protrudes from the sleeve and on said threaded portion is a nut —12— whereby the spindle is sustained against upward movement. The nut —12— is locked to the spindle by means of a removable pin —13— passing through coinciding apertures in the parts. The said nut bears with its upper face against a metal washer —14—, and between this washer and lower end of the sleeve —4— is preferably interposed a fiber washer —15—.

To the spindle of each lamp-bracket is connected a horizontal rearwardly extending arm —16—. This arm is preferably formed at its attaching end with a hub —17— through which the spindle protrudes and through one side of the hub passes a set-screw —18— which engages the spindle to securely fasten the arm to said spindle. The lower protruding end portion of the spindle is inserted into a socket —19— which is preferably secured to the spindle by means of a set-screw —20— (illustrated in Fig. 7), which socket bears with its upper end against the lower face of the aforesaid hub —17—.

The arm —16— on each bracket-spindle has its outer end portion provided with an upwardly projecting offset —21— on which is formed a ball —22—. To connect the arms —16—16— of the two bracket-spindles, I insert the ball —22— of each arm in a horizontally arranged tubular socket —23— of corresponding diameter and provide the socket with a longitudinal slot —24— extending to one end thereof, through which slot passes the offset —21— of the arm, said sockets being formed integral with sleeves —25—25— which receive the opposite end portions of a transverse rod —26—.

In each socket —23— is provided a pair of spiral-springs —27—27— between the adjacent ends of which is interposed the ball —22—, the inner spring bearing on the inner end of the socket, and the other spring bearing against a cap —28— secured removably to the outer end of the socket. The cap —28— may be attached to the socket in any convenient manner. However, I prefer to provide the outer end of the socket with an external screw-thread for the reception of the cap. To prevent the said cap from becoming loose, I provide the same with apertures —29—29— which are disposed diametrically opposite each other and are adapted to register with correspondingly arranged notches —30—30— in the adjacent end of the socket, through which apertures passes a pin —31— engaging the coinciding notches.

To connect the aforesaid sleeve —25—25— and cross-rod —26— I screw-thread the parts and provide the rod with set-nuts —32—32— bearing against the sleeves as shown in Fig. 9, and to facilitate the adjustment in the connections of the parts, I provide the respective sleeves with right and left-threads.

It will be evident that by imparting oscillating motion to one of the spindles, like motion will be transmitted by the rod —26— to the other spindle, whereby the lamp-brackets will be correspondingly turned to either the right or left. To effect this oscillating movement, I form one of the sockets —19— with a downwardly extension —33— which is provided with a transverse aperture —34— disposed at right-angles to the arm —16—, in which aperture is detachably inserted a short-arm —35—, preferably secured therein by screw-threading the parts, said arm being provided with a set-nut —36— bearing against the extension. This arm —35— extends inwardly with relation to the frame —7—, and terminates in a downwardly extending offset —37— formed on its end with a ball —38—. The ball —38— is inserted in a tubular socket —39— arranged at right-angles to the cross-rod —26—, said socket being provided with two spiral-springs between which the ball is interposed. The offset —37— passes through a longitudinal slot provided in the socket, and the forward end of the socket is provided with a removable cap —40—. This socket is formed integral with a rearwardly extending sleeve —41— which is screw-threaded internally for the reception of the forward end of a correspondingly threaded rod —42— extending along the side of the vehicle, which rod is provided with a set-nut —43— bearing against the rear end of the sleeve. The rear end of the rod is inserted into an internally screw-threaded sleeve —44— formed integral with tubular socket —45—. This socket has inserted therein a ball —46— formed on the end of an offset —47— projecting outwardly from a coupling applied to the usual depending rock-arm —48— which is actuated by the steering-gear (not shown) in the well known manner. The rear end portion of the rod —42— is provided with a set-nut —49— bearing against the end of the sleeve —44—. The ball —46— is interposed between two spiral-springs 46$^x$ in the socket —45—, and the offset —47— passes through a longitudinal slot 47$^x$ in the socket as hereinbefore explained, and the rear end of the socket —45— is provided with a removable cap —50—. Inasmuch as the connections of the offsets —37—47— and rod —42— are identical with that of the offset —21— and rod —26—, (as shown in Fig. 9), further description and illustration of said parts are unnecessary.

The coupling at the socket —45—, consists preferably of a pair of like plates —51—

—51— shaped to embrace the rock-arm —48— and provided with apertures for the reception of bolts —52—52— serving to clamp the plates longitudinally adjustable to the said rock-arm, one of which plates is formed with the aforesaid offset —47— as clearly illustrated in Figs. 4 and 6 of the drawings.

The adjustment of the coupling on the rock-arm —48— serves to increase or decrease the throw of the rod —42—, whereby the lamp-brackets may be made to turn to a greater or less degree as may be desired.

It will be understood that the end portions of the rod —42— are provided with right and left threads.

It will be evident that by providing the described yielding connections, all shock is absorbed, and rattling of the parts is obviated.

What I claim is:—

1. In a motor-vehicle, the combination with the body-supporting frame and the steering-means, of a pair of lamp-brackets mounted on said frame, each bracket comprising a vertical stationary sleeve, a spindle disposed rotatably within the sleeve and extending therethrough, and lamp-supporting arms secured to the upper end of the spindle, an arm connected to the lower end of the spindle of each bracket, a transverse rod having pivotal and yielding connections with the two arms, the spindle of one bracket having a supplemental arm fastened thereto, and a longitudinally extending rod having pivotal and yielding connections with the supplemental arm and steering means as set forth.

2. In a motor-vehicle, the combination with the steering-means, of a pair of suitably supported rotatable lamp-brackets, said brackets each comprising a vertically disposed stationary sleeve having a spindle journaled therein and lamp-supporting means attached to said spindle, arms extending horizontally and in corresponding directions from the two spindles and each arm formed with an angular offset provided on its end with a ball, a pair of longitudinally-slotted tubular sockets disposed axially in line and at right-angles to the arms, and having the balls of the respective arms inserted therein with the offsets passing through the slots thereof, a pair of spiral springs in each socket having the ball interposed therebetween, caps secured removably to the outer ends of the sockets, internally screw-threaded sleeves rigidly attached to the inner ends of the sockets, a rod having its opposite ends inserted in said sleeves, a supplemental arm secured to the spindle of one bracket and disposed at right-angles to the other arm thereof, and mechanism connecting the supplemental arm to the steering-means as and for the purpose set forth.

3. An attachment for vehicles including brackets mounted for rotation, arms movable with the brackets, a rod interposed between the arms, adjustable cushioning connections between the rods and arms, each of said connections including springs for yieldingly transmitting motion during the movement of the rod in either direction, and means under the control of the steering mechanism of a vehicle for actuating the brackets.

4. An attachment for vehicles including a bracket mounted for rotation, an arm movable with the bracket, a slotted casing, said arm extending into the slot and having an enlargement on the end thereof, springs within said casing at opposite sides of said enlargement, and an actuating rod connected to the casing.

5. An attachment for vehicles including a bracket mounted for rotation, an arm movable with the bracket, a slotted casing, said arm extending into the slot and having an enlargement on the end thereof, springs within said casing at opposite sides of said enlargement, means for adjusting the tension of said springs, and an actuating rod connected to the casing.

6. An attachment for vehicles including a bracket mounted for rotation, an arm movable with the bracket, a slotted casing, said arm extending into a slot and having an enlargement on the end thereof, a spring within said casing, bearing at one side of said enlargement, and an actuating rod connected to the casing.

7. An attachment for vehicles comprising brackets mounted for rotation, arms movable with the brackets, a rod interposed between the arms, cushioning connections between the rod and arms, one of said connections being adjustably mounted on the rod and each including spring members for yieldingly transmitting motion during the movement of the rod, and means under the control of the steering mechanism of a vehicle for actuating the brackets.

FRANK H. AUBEUF.

Witnesses:
T. F. HAND, Jr.,
J. A. BABCOCK.